(12) United States Patent
Lines et al.

(10) Patent No.: US 8,029,866 B2
(45) Date of Patent: Oct. 4, 2011

(54) DISPERSIONS OF NANO-SIZED MATERIALS

(75) Inventors: Robert Lines, Kent (GB); Russell J. Schwartz, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 387 days.

(21) Appl. No.: 12/301,623

(22) PCT Filed: May 17, 2007

(86) PCT No.: PCT/US2007/011861
§ 371 (c)(1),
(2), (4) Date: Nov. 20, 2008

(87) PCT Pub. No.: WO2007/139719
PCT Pub. Date: Dec. 6, 2007

(65) Prior Publication Data
US 2009/0142502 A1    Jun. 4, 2009

(30) Foreign Application Priority Data
May 23, 2006 (GB) .................................. 0610240.4

(51) Int. Cl.
*B05D 3/02* (2006.01)
(52) U.S. Cl. ..................... 427/384; 427/385.5
(58) Field of Classification Search ............. None
See application file for complete search history.

(56) References Cited

U.S. PATENT DOCUMENTS

| 3,676,342 A | 7/1972 | Gathman et al. |
| 5,599,529 A | 2/1997 | Cowie |
| 7,329,315 B1* | 2/2008 | Vilner et al. .................. 106/413 |
| 2005/0048010 A1 | 3/2005 | Kliss et al. |
| 2005/0120911 A1 | 6/2005 | Huber et al. |
| 2005/0182174 A1 | 8/2005 | Michael et al. |
| 2008/0227006 A1* | 9/2008 | Schwartz et al. .............. 430/56 |

FOREIGN PATENT DOCUMENTS

EP    0196678    10/1986

(Continued)

OTHER PUBLICATIONS

Leach et al., "The Printing Ink Manual", 5th Edition, published in 1993 by Blueprint.

(Continued)

*Primary Examiner* — Erma Cameron
(74) *Attorney, Agent, or Firm* — McKenna Long & Aldridge, LLP.

(57) ABSTRACT

Nano-sized particles of inorganic material, e.g. zinc oxide, cerium oxide or titanium oxide, can be dispersed to form a stable dispersion in a liquid medium, by using as the dispersant a compound of formula (I): in which: $R^1$ represents a hydrogen atom or a lower alkyl group; $R^2$ represents a carboxy group, or a salified or esterified carboxy group; m is 1 or 2; and n is a number from 4 to 200.

(I)

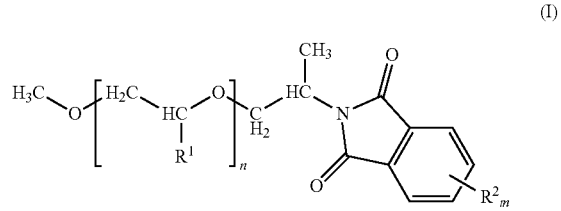

20 Claims, 2 Drawing Sheets

FOREIGN PATENT DOCUMENTS

| WO | WO-02/085992 | 10/2002 |
| WO | WO-2004/108599 | 12/2004 |
| WO | WO-2005/056693 | 6/2005 |
| WO | WO-2005/071002 | 8/2005 |

OTHER PUBLICATIONS

International Search Report for PCT/US2007/011861 dated Oct. 29, 2007.

* cited by examiner

DISPERSIONS OF NANO-SIZED MATERIALS

The present invention relates to the preparation of dispersions of nano-sized inorganic particles.

For the purpose of this specification, the expression "nano-sized" means having a weight average particle size less than 100 nm, more preferably not greater than 70 nm and most preferably from 70 to 20 nm, and other expressions and words including the modifier "nano" should be construed accordingly.

A number of inorganic materials, especially oxides, such as zinc oxide (ZnO), cerium oxide (CeO$_2$) and titanium dioxide (TiO$_2$), are efficient absorbers of ultraviolet radiation (UV). In particular, the strong UVa and UVb absorption of these oxides, especially ZnO, means that these can be used to produce coatings for use in packaging applications, particularly food packaging applications, where the lack of migration is a distinct advantage over conventional organic UV absorbers. For such applications, it is normally desirable that the coatings should be clear. To minimize haze in the coatings, the particle size and the refractive index of the oxide should be so chosen that the particles of the oxide do not scatter visible light. In general, this means that the oxide should have a particle size less than 100 nm. This requirement is met by grinding a powder of the oxide in a diluent containing a suitable dispersant. Ideally, the resulting dispersion should have a high concentration of oxide, exhibit a low and stable viscosity and be capable of let down with a variety of resin systems to give clear UV absorbing coatings. A problem with many conventional pigment dispersants is that they are effective for particles of greater than 100 nm and, although stable nano dispersions can be produced, they tend to have shortcomings such as high viscosity and/or low concentration. Thus, there is a need for a dispersant that can stabilize nano particles to give a versatile concentrate compatible with a wide range of resins. Moreover, in order to produce a suitable coating, it is desirable that the dispersion should have a relatively low viscosity and as high as possible a content of the oxide or other inorganic particles, without gelling.

Various attempts have been made to achieve this ideal, utilising a variety of different approaches. For example, US 2005/0048010 describes the surface modification of zinc oxide nanoparticles to facilitate their dispersion. WO 2004/108599 and US 2005/0182174 describe the preparation of zinc oxide dispersions in which the zinc oxide particles are made to have specific physical properties in order to achieve dispersion. U.S. Pat. No. 5,599,529 describes a titanium dioxide dispersion comprising "particles of titanium dioxide having an average size of from 0.01 to 0.15 micron" (10 to 150 nm). U.S. Pat. No. 3,676,342 describes a dispersion of zinc oxide for lubricating textile machinery which comprises "zinc oxide of about 0.02 to 0.25 micron size" (20 to 250 nm) in a mixture of a naphthenate and a mineral lubricating oil.

We have now surprisingly found that stable UV-absorbing dispersions of inorganic particles can be prepared by appropriate choice of dispersant.

Thus, the present invention consists in a composition comprising a dispersion of nano-sized particles of an inorganic material, preferably an oxide, in a liquid medium, stabilised by a dispersant comprising a compound of formula (I):

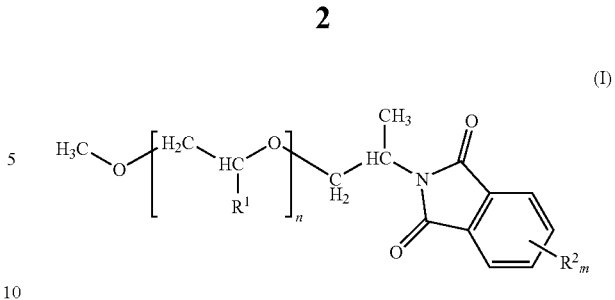

in which:
R$^1$ represents a hydrogen atom or a lower alkyl group;
R$^2$ represents a carboxy group, a phosphate group or a salified or esterified carboxy group;
m is 1 or 2; and
n is a number from 4 to 200.

The invention further consists in a process for preparing a dispersion of nano-sized particles of an inorganic material, which comprises mixing particles of an inorganic material, a compound of formula (I) and a liquid medium and grinding the particles until they have reached a nano-size and are dispersed in the liquid medium.

The invention still further consists in a process for preparing a coating, which comprises applying to a substrate a composition comprising: a dispersion as defined above; and at least one film-forming monomer and/or oligomer and/or polymer; and drying or curing the composition.

BRIEF DESCRIPTION OF THE DRAWINGS

The invention is further illustrated by reference to the accompanying drawings, in which.

Figure 1:
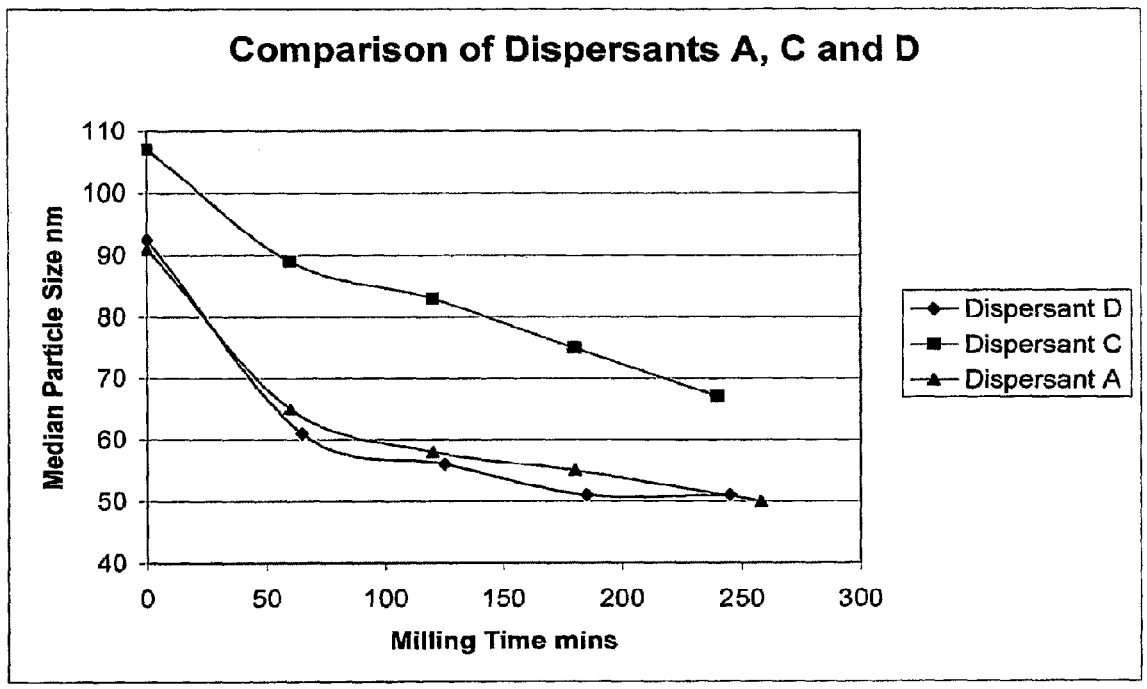
FIG. 1 shows the relationship between milling time and median particle size of zinc oxide using several different dispersants, as described in Examples 5-7.

The composition of the present invention may comprise a thermoplastic polymer that will film-form by drying (evaporation of a solvent), in which case the composition should contain a solvent. Alternatively, it may be curable by radiation, e.g. UV, electron beam or any other radiation known to those skilled in the art. In the case of UV curing, the composition should contain a photoinitiator, and special care may need to be taken in formulation, as several of the oxides suggested for use here will absorb UV radiation.

Compounds of the type of formula (I) are disclosed in US 2005/0120911 for use as dispersants of laked pigments, but these are not nano-sized particles and there is no suggestion in US 2005/0120911, the disclosure of which is incorporated herein by reference, that they have any particular advantages for use in dispersing nano-sized particles. It should be noted that, in general, dispersants useful for dispersing nano-sized particles are ineffective dispersing larger particles and vice versa.

Although the present invention arose from a need to find a dispersant for particles used as UV absorbers, it is, of course, applicable to the preparation of nanodispersions for any purpose, and so the inorganic materials may be chosen from a wide range of materials, depending on the intended purpose. Examples of inorganic materials which may be dispersed using the present invention include: metal oxides, such as zinc oxide, titanium oxide, cerium oxide, tin oxide (preferably SnO$_2$), aluminium oxide, magnesium oxide, zirconium oxide and copper oxide, especially zinc oxide, titanium oxide and cerium oxide; and other inorganic compounds, such as calcium carbonate, zinc carbonate, tungsten carbide and barium sulphate.

The liquid medium in which the particles are dispersed will be chosen having regard to the HLB (hydrophilic lipophilic balance) number of the "tail" portion of the dispersant, as is well known in the art. It should also be compatible with any other components with which the dispersion is to be mixed. As such, the choice of such liquid media is well within the knowledge of the person skilled in the art. Examples of such media include: water; alcohols, such as methanol or ethanol; esters, such as ethyl acetate; ketones, such as methyl ethyl ketone or methyl isobutyl ketone; hydrocarbons, such as aliphatic, aromatic and mixtures thereof, glycols and glycol ethers; and mixtures of any two or more thereof. Of these, ethyl acetate and industrial methylated spirit are preferred.

In the compounds of formula (I), we prefer that n should be a number from 20 to 65, more preferably about 35. We also prefer that m should be 1 or 2, more preferably 1. It will be appreciated that the compound of formula (I) actually employed may be a mixture of several compounds falling within this formula but in which the values of n and m differ. Accordingly, although the value of n or m for any given molecule is necessarily an integer, the value of n or m measured for the bulk material may be non-integral. We also prefer that the average molecular weight of the compound of formula (I) should be from about 1000 to about 10,000, more preferably from 1000 to 3000, and most preferably about 2200.

$R^1$ may be a hydrogen atom or a lower alkyl group. Where $R^1$ represents a lower alkyl group, this is preferably a group having from 1 to 6 carbon atoms, such as a methyl, ethyl, propyl, isopropyl, butyl, sec-butyl, t-butyl, isobutyl, pentyl or hexyl group. More preferably, $R^1$ represents a hydrogen atom or a methyl group. Since there is a plurality of groups $R^1$, these may all represent the same group or atom or may represent two or more of the possible groups or atoms. In particular, the several groups represented by $R^1$ may represent a mixture of hydrogen atoms and methyl groups, preferably in a ratio of methyl groups to hydrogen atoms of from 5:1 to 1:5. In two particularly preferred dispersants, this ratio is 29:6 and 10:31, respectively. These groups or atoms represented by $R^1$ will define the HLB number of the dispersant.

Surprisingly, although the compound of formula (I) is a very effective dispersant for non-nano-sized laked pigments, it is also very effective for nano-sized particles and provides a low viscosity, stable dispersion that shows no signs of gelling.

The compounds of formula (I) may be prepared as described in US 2005/0120911.

To prepare the dispersion of nano-sized particles, commercially available inorganic particles are preferably mixed with the dispersant and the liquid medium and ground using a conventional grinder. This may be carried out as in the prior art, and the methods and apparatus used are well known to those skilled in the art. Alternatively, if the inorganic particles are already nano-sized, they may simply be mixed with the dispersant and liquid medium.

The size of the nanoparticles may readily be measured by conventional means. In the present specification, we use an acoustic spectrometer (Dispersion Technology Inc, model DT 1200), and, when we refer to particle sizes, we are referring to sizes measured in this way. It is an advantage of the use of the acoustic spectrometer that it measures particle size distributions without the need to dilute the dispersions, unlike other methods such as light scattering. The measurements are thus free of possible complications such as agglomeration due to solvent shock.

The UV-absorbent coating may contain, in addition to the dispersion of the present invention, a photoinitiator, or a binder and at least one monomer and/or oligomer and/or polymer. It may also contain other well known additives, such as adhesion promoters, plasticizers and slip aids. The coating may be applied to the substrate using well known printing methods. Details of these methods and of the other components of such coating compositions may be found, for example, in The Printing Ink Manual, 5$^{th}$ Edition, edited by R. H. Leach et al., published in 1993 by Blueprint, the disclosure of which is incorporated herein by reference.

The invention is further illustrated by the following non-limiting Examples. The dispersant (HLB=2.8) used in Examples 1 to 4 of the present invention was that produced as described in Example 1 of US 2005/0120911 A1 and is referred to as "dispersant A" in the following Examples.

EXAMPLE 1

Dispersant A (27.5 g) was dissolved in Industrial Methylated Spirit (IMS, 197.5 g). The solution was stirred using a Dispermat disperser and nano ZnO powder (275 g, Element is Decelox UVT) was added portionwise to give a white opaque, homogeneous pre-dispersion containing 55% w ZnO. This mixture was introduced to a Netzsch MiniZeta bead mill containing 0.4-0.6 mm $ZrO_2$ beads at 80% fill volume. The agitator was set to 2000 rpm and the mixture was allowed to recirculate continuously. Samples were taken periodically and examined for transparency in thin film. After 8 hours, the light grey dispersion was transparent in thin film with a slight yellow tint. The viscosity was 14 s (Zahn no 2 cup) and the dispersion showed no sign of settlement even after extended storage. The average particle size was 53 nm as measured by an acoustic spectrometer (Dispersion Technology Inc, model DT 1200).

EXAMPLE 2

A nano ZnO paste (59.1% w solids) in methanol was prepared by chemical precipitation according to the method of Bayer (U.S. Pat. No. 6,710,091, Example 5). To 5 g of this white paste was added 0.3 g of dispersant A, and the mixture was stirred gently. The mixture liquefied to a low viscosity dispersion containing 55.9% w ZnO. A thin film of this dispersion was transparent.

EXAMPLE 3

Dispersant A (0.66 kg) was dissolved in IMS (4.74 kg) and to this solution a standard grade ZnO (6.6 kg, Absco) was added portionwise with vigorous stirring. The white low viscosity premix (55% w ZnO) was pumped into a Netzsch LMZ II bead mill containing 0.3 mm yttrium stabilized $ZrO_2$ beads at 80% fill volume. The mixture was milled for a total of 31 hours using continuous recirculation at rotor speeds ranging from 1400 rpm to 1850 rpm and throughputs of 1334 g min$^{-1}$ to 874 g min$^{-1}$. The resulting light grey dispersion was transparent in thin film with a slight yellow tint. The viscosity was 14 s (Zahn no 2 cup) and the dispersion showed no sign of settlement even after extended storage. The average particle size was 66 nm as measured by the DT 1200 acoustic spectrometer.

EXAMPLE 4

Compatibility of ZnO/dispersant A dispersions with various resins was assessed and is reported in the following Table 1:

TABLE 1

| Composition | | | Properties | |
|---|---|---|---|---|
| ZnO:dispersant A:Resin | Diluent | Solids % w | Dispersion | Coating |
| 80:8:12 Nitrocellulose (Nobel DHX 3/5) | IMS/EtOAc | 30 | Viscosity 16 s (Zahn 2), no settlement | Clear |
| 77:7.7:15.3 Vinyl (Dow UCAR VAGD) | IMS/EtOAc | 44 | Viscosity 21 s (Zahn 2), no settlement | Clear |
| 80:8:12 Polyvinyl butyral (Pioloform BN18) | IMS | 30 | Viscosity 15 s (Zahn 2), no settlement | Clear |
| 80:8:12 Polyurethane (Unithane 671S) | IMS/EtOAc | 30 | Viscosity 15 s (Zahn 2), no settlement | Clear |
| 80:8:12 Ethylcellulose (Dow Ethocel 7 cps) | IMS/EtOAc | 30 | Viscosity 23 s (Zahn 2), no settlement | Clear |

IMS is Industrial Methylated Spirit; EtOAc is ethyl acetate

EXAMPLES 5 TO 7

Dispersants B, C and D were prepared in a similar manner to Dispersant A (Table 2).

TABLE 2

| | | 'Tail' Properties | | |
|---|---|---|---|---|
| Example | Dispersant | Mol ratio PO:EO | MW | HLB |
| 5 | B | PPO only | 1000 | <1 |
| 6 | C | 9:1 | 600 | 2 |
| 7 | D | 10:31 | 2000 | 13.8 |

The effectiveness of dispersants B, C and D was determined by repeating the experiment of Example 1. The viscosities of the premixes and final dispersions were measured while the median particle sizes were obtained periodically during milling. The results are summarised in Table 3 and in FIG. 1 of the accompanying drawings.

TABLE 3

| | | Premix Properties | | Dispersion Properties | | |
|---|---|---|---|---|---|---|
| Dispersant | ZnO % w | Viscosity (Zahn 2) | Stability | Viscosity (Zahn 2) | PS nm | Stability (2 weeks storage) |
| A | 55 | 51 s | stable | 13.8 s | 50 | no sediment |
| B | 44 | thixotropic | gradual phase separation | not milled | — | — |
| C | 55 | >90 s | stable | 13.7 s | 67 | some sediment but redispersible |
| D | 55 | 47.8 s | stable | 13.9 s | 51 | no sediment |

General Milling Conditions
Target dispersion: 55% w ZnO
ZnO: Dispersant=10:1
Solvent: IMS
Mini Zeta $ZrO_2$ beads at 80% v, 2000 rpm
Milling time: 4 hours

EXAMPLES 8 AND 9

Two radiation curable formulations were prepared by adding a radiation curable monomer (pentaerythritol ethoxylate-tetraacrylate (PPTTA), Photomer 4172 (Cognis)) portionwise with stirring to the ZnO dispersion of Example 1. There was no sign of instability during the additions and homogeneous mixtures were obtained. Finally, the alcohol was removed at 50° C. under vacuum to give solvent-free dispersions (Table 4).

TABLE 4

| | Example 8 (50% ZnO) | | Example 9 (60% ZnO) | |
|---|---|---|---|---|
| Components | Composition pbw | Solvent free viscosity | Composition pbw | Solvent free viscosity |
| ZnO dispersion | 70.23 | 105 s (Zahn 2) | 76.64 | 200 s (Zahn 2) |
| PPTTA | 29.70 | | 23.30 | |
| BHT inhibitor | 0.07 | | 0.06 | |

The two formulations were applied to polypropylene film using a wirebar applicator (6 μm wet film thickness) to give clear coatings. The films were then subjected to ϵ-beam radiation whereupon transparent tack free films were produced.

EXAMPLE 10

Figure 2:
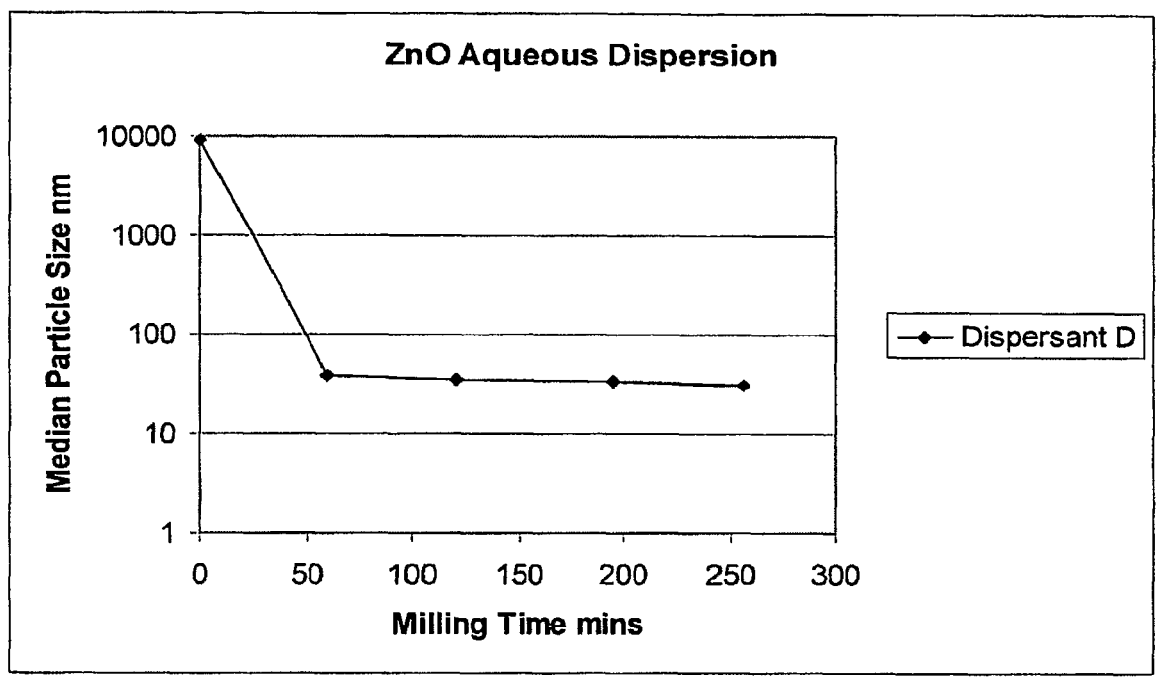
FIG. 2 shows the relationship between milling time and median particle size of zinc oxide using dispersant D, as described in Example 10.

The HLB value of Dispersant D (Example 7, Table 2) suggested that it could be suitable for use in aqueous media. The procedure of Example 1 was followed but substituting Dispersant D for Dispersant A and deionised water for IMS. Milling was carried out for 4¼ hrs to give a low viscosity stable dispersion whose properties are summarised in Table 5 and in FIG. 2 of the accompanying drawings.

TABLE 5

| | Premix Properties | | Dispersion Properties | | |
|---|---|---|---|---|---|
| ZnO % w | Viscosity (Zahn 2) | Stability | Viscosity (Zahn 2) | PS nm | Stability (2 weeks storage) |
| 55 | 26 s | Stable | 15 s | 31 | No sediment |

A coating formulation was prepared by adding an aqueous solution of poly(vinylpyrrolidone) (13.3:% w, 36 parts) drop wise to the stirred ZnO dispersion (64 parts). No instability was noted during the addition and a low viscosity lacquer having a ratio of ZnO:Dispersant:PVP=80:8:12 at 40% w solids was obtained. The lacquer was applied to a polyolefin film using a wirebar coater (6μ wet film thickness) and, after drying. a clear coating was produced.

EXAMPLE 11

Dispersant A (17 g) was dissolved in IMS (190.8 g). The solution was stirred using a Dispermat mixer, and titanium dioxide (170 g, Degussa P25) was added portion wise to give a viscous premix containing 45% w $TiO_2$. The premix was charged to a MiniZeta bead mill containing $ZrO_2$ beads (0.4-0.6 mm) at 80% fill volume. The mixture was milled at 2000 rpm for a total of 9 hours to give a low viscosity (16 s Zahn 2 cup) grey coloured dispersion. The median particle size was 34 nm and the dispersion was storage stable.

COMPARATIVE EXAMPLE 1

The experimental procedure of Example 1 was followed except that Disperbyk 111 (BYK Chemie) was substituted for the dispersant A. The mixture was milled for 6 hours to give a grey dispersion of viscosity 17 s (Zahn no 2 cup) and exhibiting transparency in thin film. On storage, the ZnO gradually settled out.

COMPARATIVE EXAMPLE 2

The experimental procedure of Example 1 was followed except that Disperbyk 111 (BYK Chemie) was substituted for the dispersant A and ethyl acetate was used as the solvent. The mixture was milled for 6 hours, to give a dark tan dispersion that exhibited transparency in thin film but readily gelled upon standing.

COMPARATIVE EXAMPLE 3

Nitrocellulose (50 g DHX 3/5, isopropyl alcohol wetted) was dissolved in a mixture of IMS (147.5 g) and ethyl acetate (162.5 g) and to this solution nano ZnO powder (140 g, Elementis Decelox UVT) was added portionwise with vigorous stirring using a Dispermat disperser. The resulting premix (80% w ZnO at 35% solids) was charged to a Netzsch MiniZeta bead mill containing 0.4-0.6 mm $ZrO_2$ beads at 80% fill volume. The mixture was milled at 2000 rpm for 12 hours, with continuous recirculation, to yield a light grey dispersion that was clear in thin film with a slight yellow tint. On storage, the dispersion gradually increased in viscosity and eventually gelled.

The invention claimed is:

1. A composition comprising a dispersion of nano-sized particles of an inorganic material in a liquid medium, stabilised by a dispersant comprising a compound of formula (I):

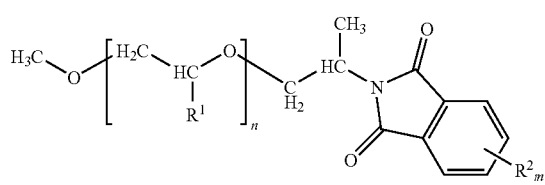

in which:
$R^1$ represents a hydrogen atom or a lower alkyl group;
$R^2$ represents a carboxy group, or a salified or esterified carboxy group;
m is 1 or 2; and
n is a number from 4 to 200.

2. A composition according to claim 1, in which the inorganic material is a metal oxide.

3. A composition according to claim 2, in which the metal oxide is zinc oxide, cerium oxide or titanium oxide.

4. A composition according to claim 3, in which the metal oxide is zinc oxide.

5. A composition according to claim 1, in which the inorganic material is tungsten carbide.

6. A composition according to claim 1, in which, in said compound of formula (I), m is 1.

7. A composition according to claim 1, in which, in said compound of formula (I), n is a number from 20 to 65.

8. A composition according to claim 7, in which, in said compound of formula (I), n is a number about 35.

9. A composition according to claim 1, in which said compound of formula (I) has an average molecular weight of from 1,000 to 10,000.

10. A composition according to claim 9, in which said compound of formula (I) has an average molecular weight of from 1,000 to 3,000.

11. A composition according to claim 9, in which said compound of formula (I) has an average molecular weight of about 2,200.

12. A composition according to claim 1, in which, in the compound of formula (I), the symbols $R^1$ represent a mixture of hydrogen atoms and methyl groups.

13. A composition according to claim 12, in which the ratio of methyl groups to hydrogen atoms represented by $R^1$ is from 5:1 to 1:5.

14. A composition according to claim 13, in which said ratio is 29:6.

15. A composition according to claim 13, in which said ratio is 10:31.

16. A composition according to claim 1, additionally comprising at least one film-forming monomer or oligomer or polymer or combination thereof.

17. A process for preparing a dispersion of nano-sized particles of an inorganic material, which comprises mixing particles of an inorganic material, a compound of formula (I):

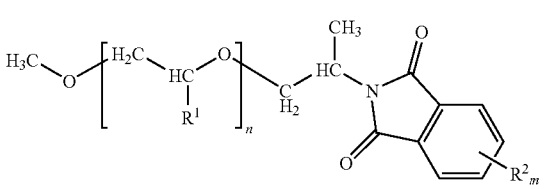

in which:
$R^1$ represents a hydrogen atom or a lower alkyl group;
$R^2$ represents a carboxy group, or a salified or esterified carboxy group;
m is 1 or 2; and
n is a number from 4 to 200, and a liquid medium, and grinding the particles until they have reached a nano-size and are dispersed in the liquid medium.

18. A process according to claim 17, in which said inorganic material is a metal oxide.

19. A process for preparing a coating, which comprises applying to a substrate a composition according to claim 16; and drying or curing the composition.

20. A process according to claim 17 in which said inorganic material is selected from the group consisting of zinc oxide, cerium oxide, titanium oxide and tungsten carbide; and in which, in said compound of formula (I), m is 1, n is a number from 20 to 65, the symbols $R^1$ represent a mixture of hydrogen atoms and methyl groups in a ratio of methyl groups to hydrogen atoms from 5:1 to 1:5, and said compound of formula (I) has an average molecular weight of from 1,000 to 10,000.

* * * * *